UNITED STATES PATENT OFFICE.

ARTHUR ZITSCHER, FELIX KUNERT, AND EDWIN ACKER, OF OFFENBACH-ON-THE-MAIN, GERMANY, ASSIGNORS TO THE CORPORATION OF CHEMISCHE FABRIK GRIESHEIM-ELEKTRON, OF FRANKFORT-ON-THE-MAIN, GERMANY.

CONDENSATION PRODUCTS FROM THE ARYLAMIDS OF 2.3-OXYNAPHTHOIC ACID AND FORMALDEHYDE AND AZO DYESTUFFS THEREFROM AND PROCESS OF MAKING SAME.

1,122,564.     Specification of Letters Patent.     Patented Dec. 29, 1914.

No Drawing.     Application filed April 17, 1914. Serial No. 832,522.

*To all whom it may concern:*

Be it known that we, ARTHUR ZITSCHER, FELIX KUNERT, and EDWIN ACKER, citizens of the German Empire, and residents of Offenbach-on-the-Main, in the Grand Duchy of Hesse, Germany, have invented new and useful improvements in condensation products from the arylamids of 2.3-oxynaphthoic acid and formaldehyde and azo dyestuffs therefrom and processes of making same, of which the following is a specification.

Our invention relates to the manufacture of condensation products from the arylamids of 2.3-oxynaphthoic acid of the general formula

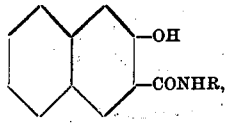

wherein R means an aromatic radical and formaldehyde and the application of these products for the production of azo dyestuffs.

We have found that by causing formaldehyde to act upon the arylamids of 2.3-oxynaphthoic acid in alkaline solution already at ordinary temperature new compounds are formed and that these condensation products can be used for the production of azo dyestuffs by combining with a non-sulfonated diazo compound either separately or on the vegetable fiber.

Under the term "a non sulfonated diazo compound" we include besides the simple non-sulfonated diazo compounds also non-sulfonated tetrazo compounds and diazo derivatives of aminoazo compounds. The constitution of the new condensation products is unknown, but they are strictly distinguished from the parent products and also from N-methylol derivatives like those, which Einhorn has obtained by condensing amids of acids with formaldehyde in presence of an alkali (see *Annalen der Chemie*, volume 343, page 207 and the German Letters Patent No. 157355). Without any doubt they are typical arylamids of 2.3-oxynaphthoic acid, as it is shown by all their behavior for instance the yellow color of their alkaline solutions typical for arylamids, and by their reaction on diazo compounds.

The new condensation products are, when dry, feebly colored powders relatively easily soluble in the most of the usual organic solvents, being decomposed when heated, becoming brown, soluble in diluted caustic soda lye to a yellow solution.

For the production of azo dyestuffs the separated products, but also the solutions can be used, which are formed by mixing the solutions of the arylamids of 2.3-oxynaphthoic acid with formaldehyde. The dyestuffs can be produced either separately or on the fiber.

The following examples will serve to illustrate further how our invention can be carried into practical effect, but it is not confined to these examples. The parts are by weight.

Example I: Into a solution of 26.3 parts of the anilid of 2.3-oxynaphthoic acid in diluted caustic soda lye, 10 parts of an aqueous solution of formaldehyde of 30 per cent. strength are poured at ordinary temperature. After stirring for some time the product is precipitated by adding diluted hydrochloric acid, filtered, washed until neutral, pressed and dried at low temperature. It forms a feebly yellowish powder, easily soluble in aceton, alcohol, ether, ethyl acetate and acetic acid, more sparingly soluble in benzene, petroleum ether or solvent naphtha. When heated it is decomposed becoming brown. It is soluble in diluted caustic soda lye to a yellow solution. Instead of the anilid of 2.3-oxynaphthoic acid its substitution products and analogues can be used. The proportion of formaldehyde and the temperature of reaction can be varied from those given in the example.

Example II: A caustic alkaline solution of 27.6 parts of the anilid of 2.3-oxynaphthoic acid is slowly mixed while stirring with 10.5 parts of an aqueous solution of formaldehyde of 30 per cent. strength, and stirred for half an hour at ordinary temperature. After addition of such a quantity of sodium acetate that the solution does not contain mineral acid at the end of the reaction, the solution is poured while stirring well into a solution, prepared in usual manner, of a diazo compound from 15.2 parts of para-nitro-ortho-toluidin

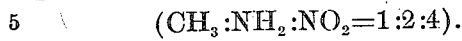

The dyestuff separates in the form of red flakes; when the combination is complete the dyestuff is filtered, washed until neutral and preferably used in form of a paste for the production of lakes. When dry it forms a bright red powder, soluble in concentrated sulfuric acid to a bluish red solution.

Example III: Production on cotton yarn of the dyestuff obtainable by combining diazotized paranitranilin with the condensation product from formaldehyde and the analid of 2.3-oxynaphthoic acid: The completely dried, bleached or raw cotton-yarn well boiled with carbonate of soda or caustic soda, is impregnated with the following solution and completely dried: analid of 2.3-oxynaphthoic 120 grams, caustic soda lye of 35° Baumé 200 ccm., formaldehyde of 30 per cent. strength 120 ccm., ricinoleate of soda of 60 per cent. strength 200 grams—made up to 10 liters. Then it is introduced into the dyebath, well handled, wrung out and allowed to hang for a short time before being passed through the bath a second time, if necessary.

The dye-bath is prepared as follows:

*Diazo solution.*—560 grams of para-nitranilin are stirred with 500 ccm. of hot water, and 315 grams of sodium nitrite are added. The nitrite of soda being completely dissolved, this paste is poured while stirring continuously into a mixture of 4000 grams of ice, 2000 grams of ice-water and 1040 ccm. of hydrochloric acid of 20° Bé. After a short time the whole is filtered and made up to 10 liters.

*Dye-bath.*—5 liters of the diazo solution are mixed with 14 liters of ice-water, and shortly before dyeing 1200 ccm. of a solution of sodium acetate (1:1) are added. In this manner beautiful red tints fast to rubbing are obtained.

Example IV: Production on cops of the dyestuff, obtainable by combining tetrazotized dianisidin with the condensation product from formaldehyde and the anilid of 2.3-oxynaphthoic acid: The cops are impregnated in the Obermaier apparatus with the following solution, then thoroughly drained and well dried: 120 grams of anilid of 2.3-oxynaphthoic acid, 200 grams of caustic soda lye of 35° Baumé, 120 ccm. of an aqueous solution of formaldehyde of 30 per cent. strength, 200 grams of ricinoleate of soda of 60 per cent. strength—made up to 10 liters.

The diazo solution is prepared as follows: 240 grams of dianisidin are stirred with 210 ccm. of hydrochloric acid of 20° Bé. and dissolved in 2500 grams of boiling water. To the cold solution are added 2000 grams of ice and 150 ccm. of hydrochloric acid of 20° Baumé and a solution of 160 grams of sodium nitrite in 500 grams of water is allowed to run in slowly while stirring continuously and the whole made up to 10 liters.

The dye-bath is prepared as follows: 1000 ccm. of the diazo solution are mixed with 100 ccm. of a solution of cupric chlorid of 40° Baumé, 24 ccm. of a solution of chromic acid (1:10) and 200 ccm. of a solution of aluminium acetate of 12° Baumé and shortly before dyeing 150 ccm. of a solution of sodium acetate (1:1) are added; the whole is made up to 20 liters. The dried material is dyed in the dye-bath, well drained once more, washed and soaped. In this manner greenish blue tints are obtained fast to rubbing, especially fast to light and excellently fast to soap and chlorin, nearly coming up to the indigo tone. Cross reels and loose cotton can be dyed in like manner.

In this process cotton goods, which have been impregnated with a solution of the condensation product from formaldehyde and an arylamid of 2.3-oxynaphthoic acid, can be treated with a diazo compound while still wet, without being dried. With other non-sulfonated diazo, diazo-azo, or tetrazo compounds the process can be conducted in a corresponding manner. Thus the shade obtained by combining the diazo compounds of ice-black-base, that is a mixture of dianisidin and benzidin, is dark bluish-black, of para-toluidin bright reddish orange, of pseudo-cumidin bright bluish red, of orthoanisidin a bluish red, of α-napthyl-amin a dark very bluish bordeaux.

Instead of the condensation product from formaldehyde and the analid of 2.3-oxynaphthoic acid, the condensation products from formaldehyde and other arylamids of 2.3-oxynaphthoic acid may be used; for instance those from the toluidids or the chloro or nitranilids. Thus, by combining the diazo compound of meta-nitro-ortho-anisidin with the condensation product from formaldehyde and the meta-nitranilid of 2.3-oxynaphthoic acid a very bluish red is obtained, and by combining diazotized para-nitro-ortho-anisidin with the condensation product from formaldehyde and the meta-chloranilid of 2.3-oxynaphthoic acid a bluish-red is also obtained. All shades are excellent in respect of good fastness to rubbing and soap.

Now what we claim and desire to secure by Letters Patent is the following:

1. The process of making azo dyestuffs consisting in causing formaldehyde to act upon the arylamids of 2.3-oxynaphthoic acid in presence of an alkali and in combining the condensation products thus obtained with a non-sulfonated diazo compound.

2. As new articles the condensation products from the arlyamids of 2.3-oxynaphthoic acid and formaldehyde, which are, when dry, feebly colored powders, relatively easily soluble in the most of the usual organic solvents, being decomposed, when heated, becoming brown, soluble in diluted caustic soda lye to a yellow solution.

That we claim the foregoing as our invention, we have signed our names in presence of witnesses, this 30th day of March 1914.

ARTHUR ZITSCHER.
    FELIX KUNERT.
    EDWIN ACKER.

Witnesses as to Arthur Zitscher and Felix Kunert:
  JEAN GRUND,
  CARL GRUND.

Witnesses as to Edwin Acker:
  CLARENCE CORRIGAN,
  MARIUS HERMAZ.